United States Patent [19]

Beach

[11] Patent Number: 4,894,673

[45] Date of Patent: Jan. 16, 1990

[54] FILM CASSETTE

[75] Inventor: David E. Beach, Stowe, Vt.

[73] Assignee: Eastman Kodak Company, Rochester, N.Y.

[21] Appl. No.: 296,466

[22] Filed: Jan. 12, 1989

[51] Int. Cl.$^4$ ............................................. G03B 17/26
[52] U.S. Cl. ..................................... 354/275; 242/71.1
[58] Field of Search .................. 354/216, 275; 242/71, 242/71.1, 71.2

[56] References Cited

U.S. PATENT DOCUMENTS

| | | | |
|---|---|---|---|
| 3,467,341 | 11/1966 | Roman | 242/197 |
| 3,747,865 | 7/1973 | Tobey | 242/71.1 X |
| 3,768,894 | 10/1973 | Cook | 354/275 X |

Primary Examiner—L. T. Hix
Assistant Examiner—Brian W. Brown
Attorney, Agent, or Firm—Roger A. Fields

[57] ABSTRACT

In a film cassette, an "exposure-completed" indicator is positioned within a film passage slit to the outside of the cassette shell to be normally covered by the filmstrip. The indicator is uncovered by the filmstrip only when a leader section of the filmstrip is wound through the film passage slit further into the cassette shell, after the filmstrip is completely exposed in a camera. A window is provided in the cassette shell to view the indicator whenever it is uncovered by the filmstrip. This feature is useful to prevent double exposure of the filmstrip, by informing the photographer that the filmstrip should not be re-used in the camera.

2 Claims, 5 Drawing Sheets

FILM CASSETTE

CROSS-REFERENCE TO RELATED APPLICATIONS

Reference is made to the following commonly assigned copending applications:

(1) Ser. No. 173,396, entitled FILM CASSETTE, and filed Mar. 25, 1988 in the names of Jeffrey C. Robertson and Mark D. Fraser;

(2) Ser. No. 193,323, entitled FILM CASSETTE, and filed May 12, 1988 in the name of Jeffrey C. Robertson;

(3) Ser. No. 215,705, entitled FILM CASSETTE, and filed July 6, 1988 in the name of Donald M. Harvey; and (4) Ser. No. 07/296,558, entitled FILM CASSETTE, and filed on the same day as this application in the name of Donald M. Harvey.

(5) Ser. No. 07/296,473, entitled FILM CASSETTE, and filed onthe same day as this application in the name of Donald M. Harvey.

BACKGROUND OF THE INVENTION

1. Field of the Invention

The invention relates generally to the field of photography, and particularly to a film cassette containing roll film.

2. Description of the Prior Art

In conventional 35mm film manufacturers' cassettes, such as manufactured by Eastman Kodak Co. and Fuji Photo Film Co. Ltd., th filmstrip is wound on a flanged spool which is rotatably supported within a cylindrical shell. A leading or forward-most section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is manually rotated initially in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35mm camera to engage the protruding leader portion to draw the filmstrip out of the shell.

A 35mm film cassette has been proposed which, unlike conventional film cassettes, can be operated to automatically advance the filmstrip out of the cassette shell by rotating the film spool in the unwinding direction. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the forward or leading end of the filmstrip is reduced in width to allow it to protrude from between the circumferential lips and rest against the shell wall. During unwinding rotation of the film spool, the leading end of the filmstrip is advanced through the film passageway in order to exit the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges. However, transverse bowing of the filmstrip to move its edges under the circumferential lips results in increased friction between the filmstrip and the cassette structure which will impede advance of the filmstrip from the cassette shell and may damage the filmstrip.

THE CROSS-REFERENCED APPLICATIONS

Like the type of film cassette disclosed in U.S. Pat. No. 4,423,923, cross-referenced applications Ser. Nos. 173,396 and 193,323 each disclose a film cassette that contains a filmstrip which is automatically advanced through a film passageway to the outside of the cassette shell in response to rotation of the film spool in an unwinding direction.

Cross-referenced application Ser. No. 215,705 discloses a partly similar cassette wherein a film spool having a filmstrip coiled about it is selectively rotatable in opposite directions to advance a leader section of the filmstrip through a film passage slit to the outside of the cassette shell and to return the leader section to the inside of the cassette shell. In addition, the cassette shell has a recess or trap formed in it at a location along the film passage slit. The leader section includes respective integral tab members normally inclined from the plane of the leader section forwardly and rearwardly, and positioned within the recess to maintain the leader section in place and thereby prevent its casual creep along the film passage slit. The resistance of the tab members to displacement from the recess may easily be overcome by rotating the film spool to move the leader section.

Cross-referenced applications Ser. Nos. 07/296,558 and 07/296,473, discloses a partly similar cassette wherein a film retention member located along a film passage slit to the outside of the cassette shell is adapted to enter a trapping perforation in a leader section of the filmstrip to secure the leader section in the slit prior to initial advance of the filmstrip from the cassette shell or following midroll return of the filmstrip to the cassette shell. A trailing end section of the filmstrip has a cut-out which enables the filmstrip to fall away from a support for normally positioning the filmstrip within range of the retention member, when the filmstrip is advanced sufficiently from the cassette shell to move the cut-out to the support. The support includes an exposure-completed indicator that is normally covered by the filmstrip, and therefore is not visible through a window in the cassette shell. When the filmstrip falls away from the support, the indicator is uncovered and can be viewed through the window. This feature is useful for double exposure prevention of the filmstrip.

SUMMARY OF THE INVENTION

The invention provides a useful alternative to the double exposure prevention feature, i.e. the exposure-completed indicator, disclosed in cross-referenced application Ser. No. 07/296,538.

Specifically, there is provided an improved film cassette wherein (a) respective throat portions define a film passage slit to the outside of the cassette shell, (b) a normally unexposed filmstrip has a film leader originally located within the film passage slit, and (c) a film spool is rotatable in a winding direction to wind the film leader from the film passage slit further into the cassette shell after the filmstrip is completely exposed, and wherein the improvement comprises:

exposure-completed indicator means positioned within said film passage slit to be normally covered by said filmstrip, and to be uncovered by the filmstrip only when said film leader is further wound into said cassette shell in response to rotation of said film spool in the winding direction; and window means defining an opening in one of said throat portions for permitting the exposure-completed indicator means to be viewed with it is not covered by the filmstrip.

More particularly, there is provided an improved film cassette wherein (a) opposite throat portions define a film passage slit to the outside of the cassette shell, (b) a normally unexposed filmstrip has film leader originally located within the film passge slit, and (c) a film spool is rotatable in an unwinding direction to advance the filmstrip including its film leader through the film passage slit to the outside of the cassette shell, to expose the filmstrip, and is rotatable in a winding direction to wind the filmstrip including the film leader through the film passage slit further into the cassette shell, and wherein the improvement comprises:

exposure-completed indicator means positioned within said film passage slit to be covered by said filmstrip whenever the filmstrip is advanced to the outside of said cassette shell in response to rotation of said film spool in the unwinding direction, and to be uncovered by the filmstrip only when said film leader is further wound into the cassette shell in response to rotation of the film spool in the winding direction; and window means defining an opening in one of said throat portions for permitting the exposure-completed indicator means to be viewed when it is not covered by the filmstrip.

DETAILED DESCRIPTION OF THE PREFERRED EMBODIMENT

The invention is disclosed as being embodied preferably in a 35mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
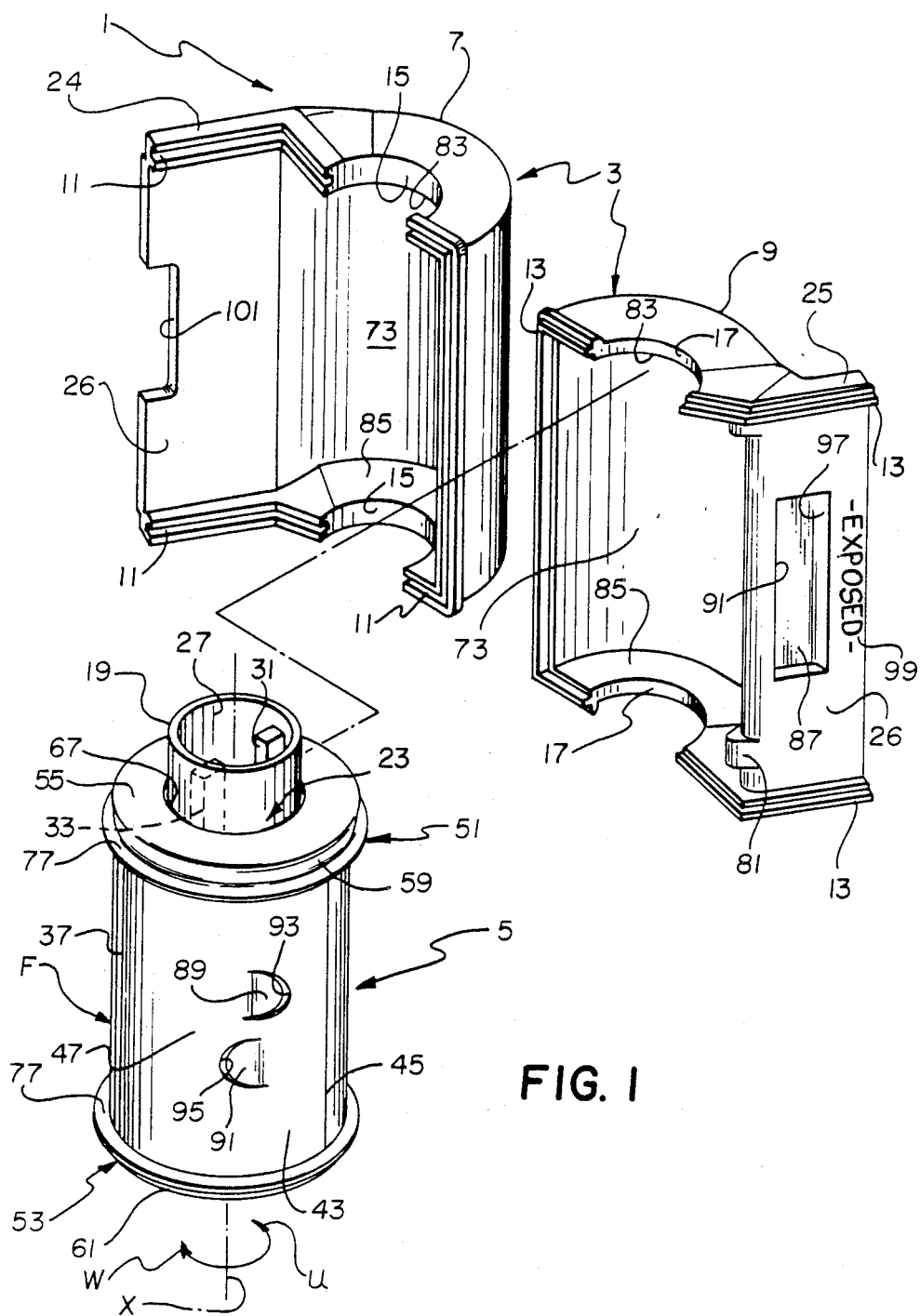
FIG. 1 is an exploded perspective view of an improved film cassette according to a preferred embodiment of the invention, showing an exposure-completed indicator located on the cassette shell.
Figure 2:
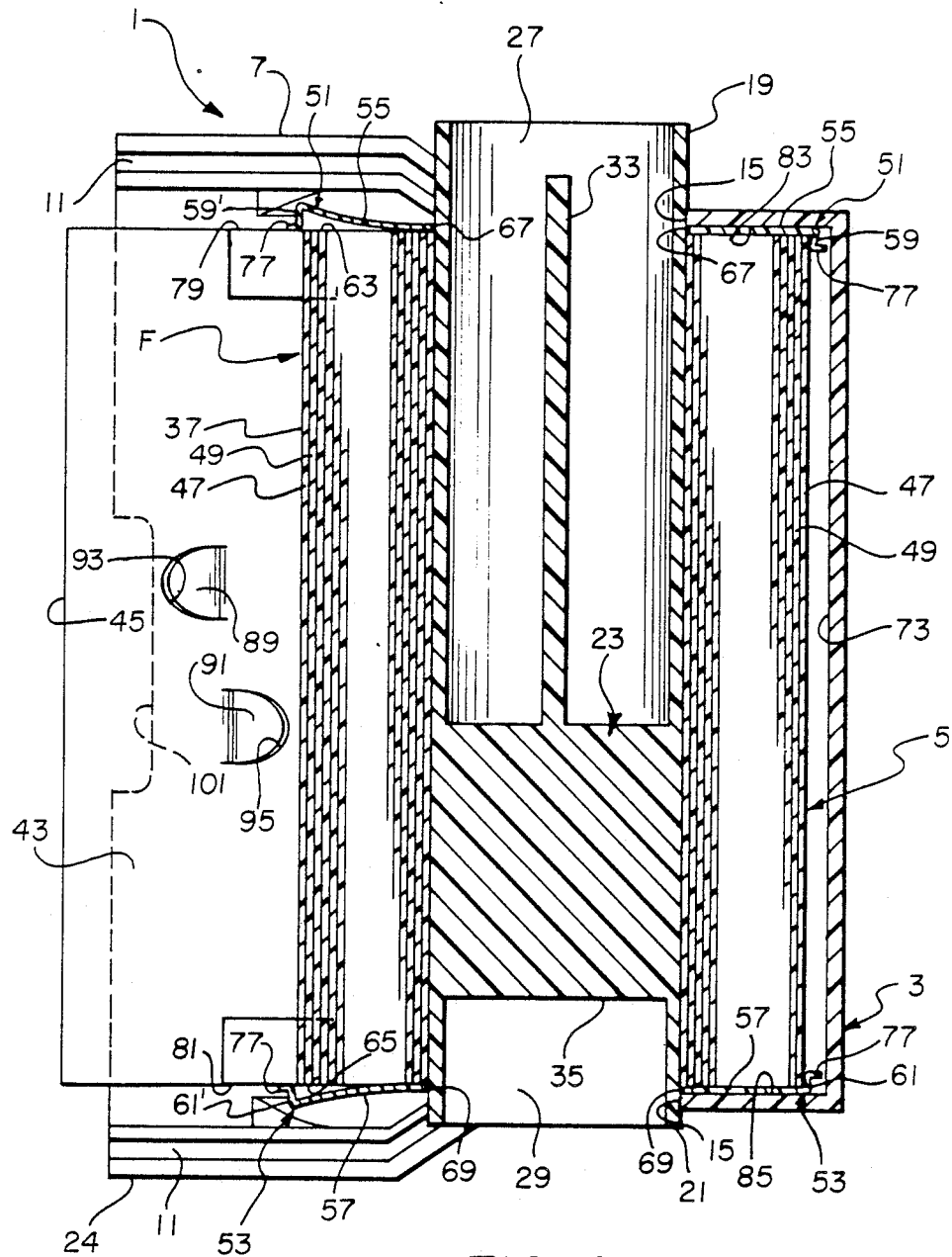
FIG. 2 is an elevation view in cross-section of the improved film cassette.
Figure 3:
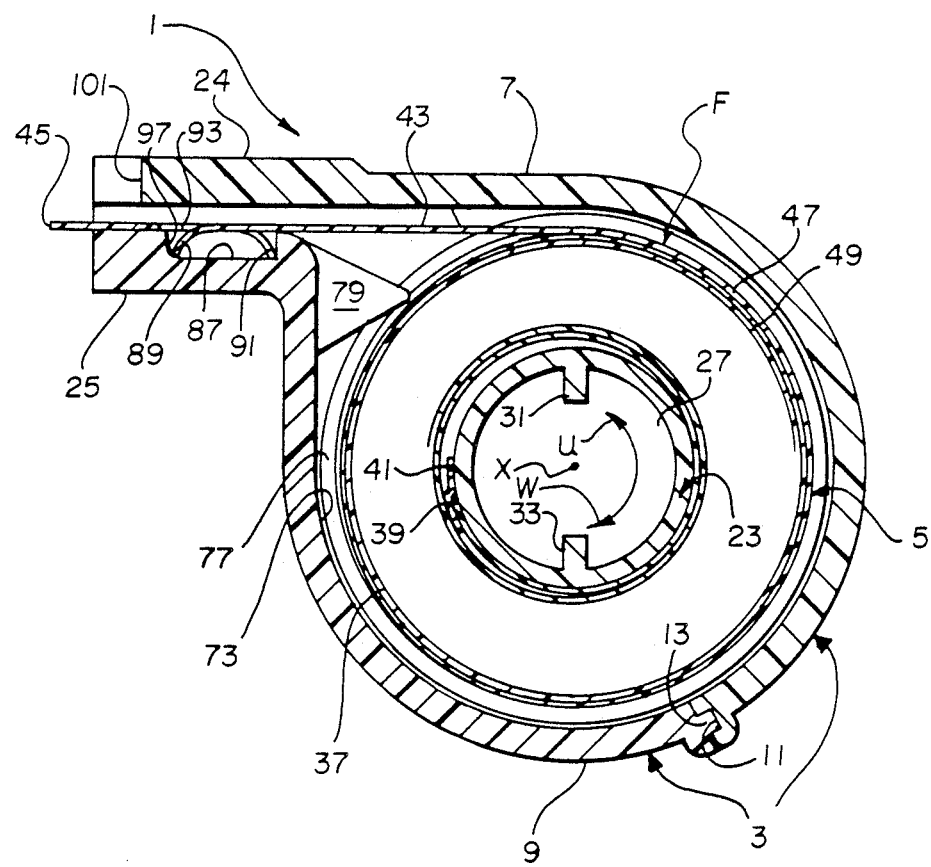
FIG. 3 is an end view in cross-section of the improved film cassette.

Referring now to the drawings, FIGS. 1-3 depict an improved 35mm film cassette 1 comprising a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 foro relatively longer and shorter opposite end extensions 19 and 21 of a spool core or hub 23. Also, they include respective throat portions 24 and 25 between which is formed a light-trapped film passage slit 26 to the outside of the cassette shell 3. The light-trapping means for preventing ambient light from entering the film passage slit 26, although not shown, may be a known velvet or plush material which lines the interior of the slit. Alternatively, a light-trapping labyrinth may be provided within the slit 26.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a winding direction indicated by the arrow W in the same FIG.

A roll 37 of convoluted 35mm film, i.e. a filmstrip F, having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2-3 convolutions of the film roll 37. One of these leader convolutions is the outermost convolution 47 and another of them is the next inward succeeding convolution 49.

Figure 4:
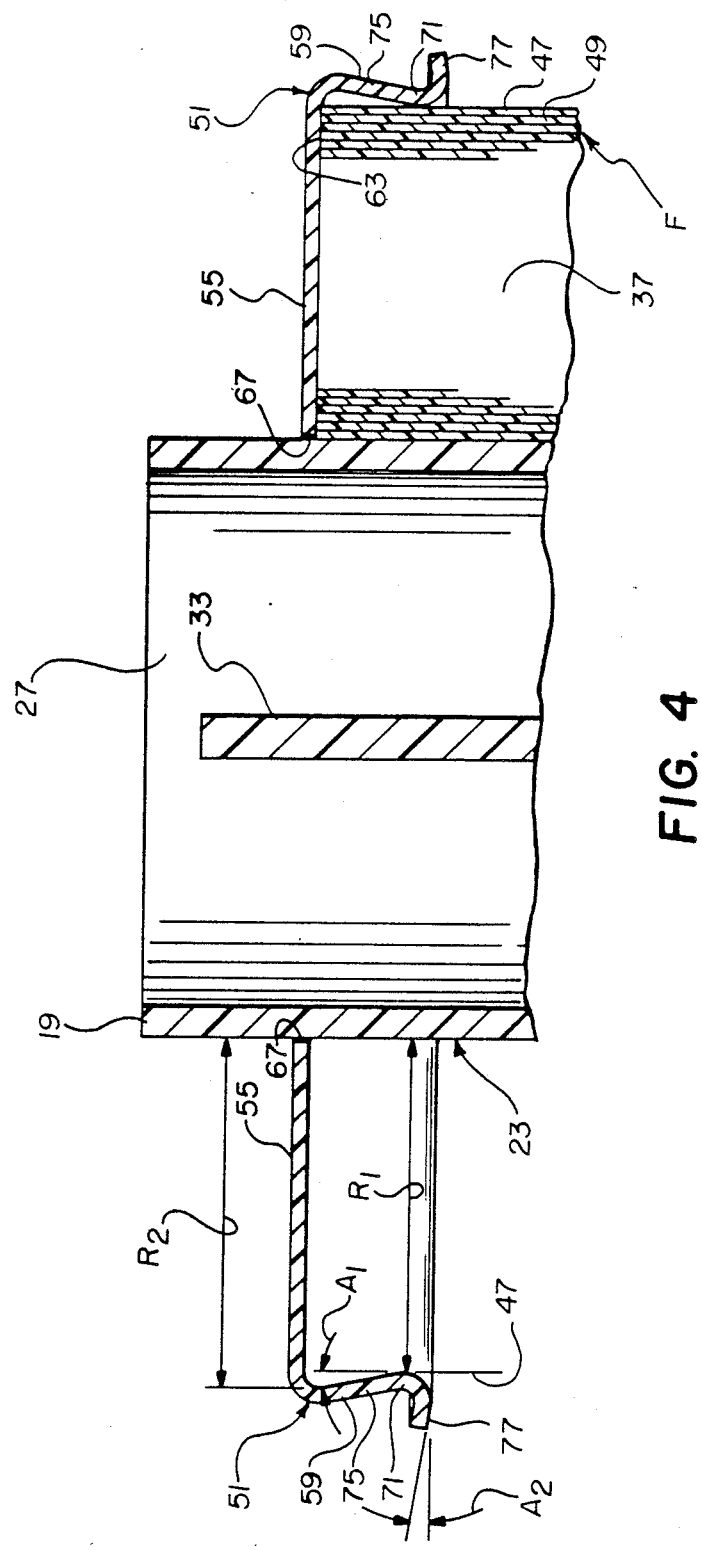
FIG. 4 is an elevation view in cross-section of one of a pair or flanges associated with a film spool in the improved film cassette.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to pemit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45', for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 26 as shown in FIG. 2. The respective spreader surfaces 79 and 81 deflect opposite limited portions 59' and 61' of the annular lips 59 and 61 axially away from each other to an axial dimension slightly exceeding the film width. See FIG. 2. In essence, the deflected portions 59' and 61' of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semi-circular flat surfaces 83 and 85 of the cassette shell 3. T6e flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59' and 61' of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1, to position either of the spreader surfaces 79 and 81 relative to an annular free end section.

In FIGS. 1–3, it can be seen that the throat portion 25 of the shell half 9 has a rectangular-shaped recess or trap 87 formed in it at a location along the film passage slit 26. The film leader 43 includes a pair of integral side-by-side tab members 89 and 91 formed by respective u-shaped slits 93 and 95 in the film leader proximate its forward end 45. The two tab members 89 and 91 are normally inclined from the plane of the film leader 43 forwardly and rearwardly as shown in FIG. 3, and are positioned within the recess 87 to maintain the film leader in place and thereby prevent its casual forward and rearward creep along the film passage slit 26. The resistance of the two tab members 89 and 91 to displacement from the recess 87 may easily be overcome by rotating the film spool 5 to move the film leader 43. Preferably, a forward side 97 of the recess 87 is sloped as shown in FIGS. 1 and 3 to facilitate forward movement of the tab member 89 out of the recess when the film spool is rotated in the unwinding direction U.

Figure 5:
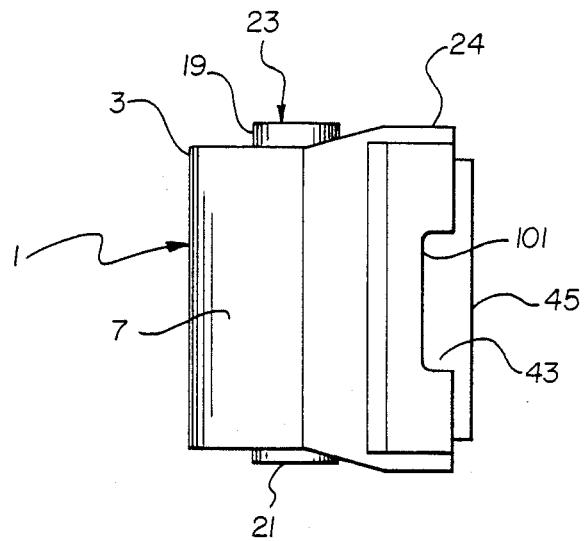
FIGS. 5 and 6 are top plan views of the improved film cassette, respectively showing a film leader covering the exposure-completed indicator and the indicator uncovered.
Figure 6:
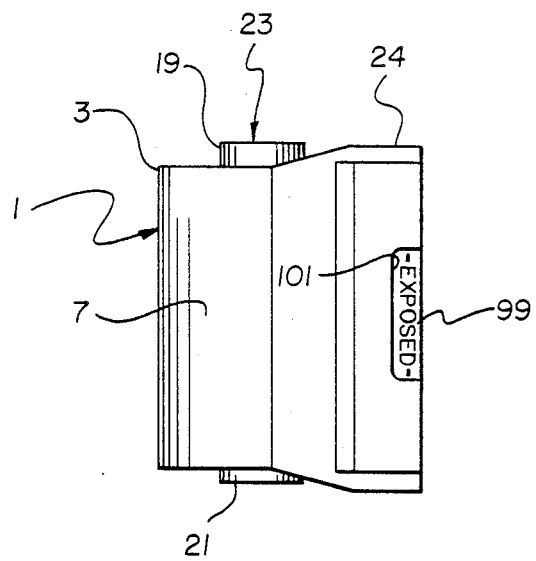

An exposure-completed indicator 99, namely "EXPOSED", is imprinted on the throat portion 25 of the shell half 9 at a location along the film passage slit 26. See FIG. 1. The indicator 99 is positioned to be normally covered by the filmstrip F as shown in FIG. 5, and is uncovered only when the film leader 43 is wound through the film passage slit 26 further into the cassette shell 3 as shown in FIG. 6 (after the filmstrip F is completely exposed in a camera, not shown). A window 101 is provided in the throat portion 24 of the shell half 7 to view the throat portion 24 of the shell half 7 to view the indicator 99 whenever it is uncovered by the filmstrip F. This feature is useful to prevent double exposure of the filmstrip F, by reminding the photographer not to re-use the filmstrip in the camera.

Operation

When the spool core 23 is initially rotated in the unwinding direction U, the two flanges 51 and 53 may remain substantially stationary and the film roll 37, since its trailing end portion 39 is attached to the spool core, tends to expand radially to ensure a non-slipping relatio between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive sections 59' and 61' of the annular lips 59 and 61 axially away from each other as the respective sections are rotated past the spreader surfaces. The deflected sections 59' and 61' of the two lips 59 and 61 are returned to their original non-flexed condition by the semi-circular flat surfaces 83 and 85. As can be appreciated from FIGS. 2–4, the outermost convolution 47 of the film roll 37 will be freed from the radial confinement of the two lips 59 and 61 in the vicinity of the two spreader surfaces 79 and 81, thereby allowing the film leader 43 to be advanced to move its two tab members 89 and 91 out of the recess 87. Then, each successive rotation of the spool core 23 in the unwinding direction U will advance a corresponding section of the filmstrip F from the cassette shell 3. Of course, during this cycle the exposure-completed indicator 99 remains covered by the filmstrip F.

If the filmstrip F is returned midroll to the cassette shell 3, i.e. before all of the film frames have been exposed, the film leader 43 will be re-parked in the film passage slit 26 to allow the two tab members 89 and 91 to drop back into the recess 87 and to continue to cover the exposure-completed indicator 99. See FIGS. 3 and 5. Conversely, if the filmstrip F is completely exposed, the film leader 43 will be wound through the film passage slit 26 further into the cassette shell 3, thereby uncovering the exposure-completed indicator 99 as shown in FIG. 6.

The invention has been described with reference to a preferred embodiment. However, it will be appreciated that variations and modifications can be effected within the ordinary skill in the art without departing from the scope of the invention.

I claim:

1. An improved film cassette wherein (a) respective throat portions define a film passage slit to the outside of the cassette shell, (b) a normally unexposed filmstrip has a film leader originally located within said film passage slit, and (c) a film spool is rotatable in a winding direction to wind said film leader from said film passage slit further into said cassette shell after said filmstrip is completely exposed, and wherein the improvement comprises:
exposure-completed indicator means positioned within said film passage slit to be normally covered by said filmstrip, and to be uncovered by the filmstrip only when said film leader is further wound into said cassette shell in response to rotation of said film spool in the winding direction; and
window means defining an opening in one of said throat portions for permitting said exposure-completed indicator means to be viewed when it is not covered by said filmstrip.

2. An improved film cassette wherein (a) opposite throat portions define a film passage slit to the outside of the cassette shell, (b) a normally unexposed filmstrip has a film leader originally located within said film passage slit, and (c) a film spool is rotatable in an unwinding direction to advance said filmstrip including its film leader through said film passage slit to the outside of said cassette shell, to expose the filmstrip, and is rotatable in a winding direction to wind the filmstrip including the film leader through the film passage slit further into the cassette shell, and wherein the improvement comprises:
exposure-completed indicator means positioned within said film passage slit to be covered by said filmstrip whenever the filmstrip is advanced to the outside of said cassette shell in response to rotation of said film spool in the unwinding direction, and to be uncovered by the filmstrip only when said film leader is further wound into the cassette shell in response to rotation of the film spool in the winding direction; and
window means defining an opening in one of said throat portions for permitting said exposure-completed indicator means to be viewed when it is not covered by said filmstrip.

* * * * *